United States Patent [19]

Hinze et al.

[11] 4,191,669
[45] Mar. 4, 1980

[54] POLYAMIDES

[75] Inventors: Adriën G. Hinze, Dordrecht; Hendrik G. Stigter, Berkenwoude, both of Netherlands

[73] Assignee: Emery Industries, Inc., Cincinnati, Ohio

[21] Appl. No.: 884,446

[22] Filed: Mar. 7, 1978

[30] Foreign Application Priority Data

Mar. 7, 1977 [NL] Netherlands ............... 7702393

[51] Int. Cl.$^2$ .............................................. C08G 69/34
[52] U.S. Cl. .................................. 260/18 N; 528/342
[58] Field of Search ...................... 260/18 N; 528/342

[56] References Cited

U.S. PATENT DOCUMENTS

| 2,149,273 | 3/1939 | Carothers | 528/342 |
|---|---|---|---|
| 2,767,089 | 10/1956 | Renfrew | 260/18 N |
| 2,811,459 | 10/1957 | Wittcoff | 260/18 N |
| 2,824,848 | 2/1958 | Wittcoff | 260/18 N |
| 2,886,543 | 5/1959 | Peerman | 260/18 N |
| 3,887,510 | 6/1975 | Chan | 528/342 |

Primary Examiner—Paul R. Michl
Attorney, Agent, or Firm—G. A. Baracka; K. D. Tremain

[57] ABSTRACT

Polyamides suitable as hot-melt adhesives and containing groups derived from a polymeric fatty acid containing 70-90% by weight of dimer acid and from a triamine of the structure

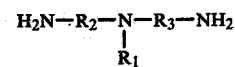

in which $R_1$ is a $C_1$–$C_3$ alkyl group and $R_2$ and $R_3$ are bivalent hydrocarbon radicals. Optionally the polyamide also contains groups derived from a $C_{2-20}$ diamine, a dicarboxylic acid containing 6–12 carbon atoms, a monocarboxylic acid or a $C_{5-12}$ lactam.

8 Claims, No Drawings

POLYAMIDES

BACKGROUND OF THE INVENTION

1. Field of the Invention

This application relates to polyamides and a process for their preparation. The polyamides are suitable for use as hot-melt adhesives and for the formation of shaped articles consisting completely or partly of such a polyamide. The invention also relates to a method for the manufacture of articles bonded with the present polyamides and to the articles so obtained.

2. Description of the Prior Art

Polyamides suitable for use as hot-melt adhesives are known. These polyamides must meet a number of requirements concerning adhesion, toughness, melting point, viscosity, elongation, elasticity, tensile strength, etc. To obtain favorable properties with respect to elongation and tensile strength highly viscous polyamides have been developed which are linear or almost completely linear. Such linear polyamines are obtained by reacting at least one bifunctional amine with molecular-distilled polymeric fatty acids consisting of 80-99% by weight of dimer with the amount of trimer and higher oligomers approximately compensated for by the amount of monomer present. Sometimes a lower dicarboxylic axid is also incorporated.

Polyamides with improved peel strength are obtained by incorporating not only ethylenediamine (EDA) but also another polyamine such as diethylenetriamine (DETA) and/or hexamethylenediamine (HMDA) in the reaction mixture. It has been found that DETA-based polyamides have particularly high peel strengths, however, probably due to the trifunctionality of DETA, polyamides based thereon are brittle and lack properties such as elongation. If, however, another diamine like e.g. HMDA is present, elongation is quite satisfactory but the peel strength is unsatisfactory when compared with DETA-based polyamides.

As pointed out polyamides exhibiting elongation are usually obtained from polymeric fatty acids having a high dimer content, typically exceeding 85% dimer. Also a certain relationship between the percentages of monomeric and trimeric constituents must be satisfied. Such pure dimers can only be obtained on a practical scale by molecular distillation of the dimer, which is cumbersome and adds considerably to the cost of the products obtained.

There is a need for polyamides combining toughness and elongation on the one hand with a high peel strength on the other hand. There is a particular need for non-brittle polyamides which are based on normal technical grades of polymeric fatty acids containing 75-85% of dimer acid.

SUMMARY OF THE INVENTION

According to the present invention, polyamides are provided combining excellent elongation with high peel strength, which are suitable for use as hot-melt adhesives, and which polyamides are comprised of groups derived from polymeric fatty acids containing 70-99% by weight dimer acid and a triamine of the structure

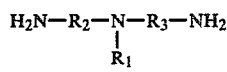

wherein $R_1$ is a $C_1$-$C_3$ alkyl group, in particular a methyl or ethyl group, and $R_2$ and $R_3$ are the same or different bivalent hydrocarbon groups and together contain at least 4 and not more than 24 carbon atoms. One or more other reactant(s) may be reacted with the polymeric fatty acid and triamine. These optional reactants include $C_{2-20}$ diamines, $C_{2-12}$ dicarboxylic acids, monocarboxylic acids of $C_{5-12}$ lactams. Especially useful polyamides are obtained when a diamine having 2 to 12 carbon atoms and a dicarboxylic acid having 6 to 9 carbon actoms are employed.

DETAILED DESCRIPTION

The improved polyamides of this invention are derived from polymeric fatty acids containing 70-99% by weight dimer acid and a triamine of the structure

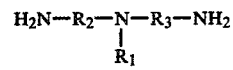

The total number of carbon atoms in the groups $R_2$ and $R_3$ can range from 4 up to about 24 but more preferably $R_2$ and $R_3$ together will have from 5 to 8 carbon atoms. $R_2$ and $R_3$ are preferably alkylene radicals having from 2 to 6 carbon atoms each and even more preferably 2 to 4 carbon atoms each. Especially useful triamines for the purpose of this invention are bis-(3-aminopropyl)-methylamine, bis-(3-aminopropyl)-ethylamine and other homologues thereof.

The polymeric fatty acid used is obtained from the polymerization of mono- and poly-unsaturated fatty acids predominantly containing 18 carbon atoms. Such procedures are known and typically result in a yield of up to 60% by weight of polymerized fatty acids being obtained. The catalyst is removed by filtration, after which the unconverted monomeric fraction is stripped off under reduced pressure. Sometimes it is desirable, in connection with the stability or colour, to hydrogenate the polymeric fatty acid residue to an iodine value below 20 or even below 10. Polymeric fatty acids of these types and useful for the preparation of the polyamides of this invention are manufactured and sold by Emery Industries, Inc. and identified as EMPOL® dimer and trimer acids. Polymeric fatty acids containing 70-99, and more preferably 75-80 percent by weight dimer acid are employed.

The present polyamide compositions are obtained by reacting the polymeric fatty acid or a lower ($C_1$-$C_4$) alkyl ester thereof with 90-110 mol% (based on the acid component) of a polyamine component which consists for 0-90 mol% of a $C_2$-$C_{20}$ diamine and 10-100 mol% of a triamine having the structure:

$$H_2N-R_2-N(R_1)-R_3-NH_2$$

when $R_1$, $R_2$ and $R_3$ are the same as defined above. The $C_2$-$C_{20}$ diamine, which is optionally used, contains two primary amine groups which are separated from each other by no more than 10 carbon atoms. Preferably the diamine will contain 2-12 carbon atoms and especially useful diamines are ethylene diamine, propylenediamine and hexamethylenediamine. Instead of the amines it is also possible to use a corresponding salt or other functional derivative which can be amidated.

If desired, another dicarboxylic acid which can contain from 2–12, and preferably 6–9, carbon atoms can be incorporated in the polyamide. Suitable dicarboxylic acids are, for example, adipic acid, azelaic acid, sebacic acid, dodecanedicarboxylic acid and terephthalic acid. These acids or their lower ($C_1$–$C_4$) alkyl esters can be included in the reaction mixture with the polymeric fatty acid in amounts of up to 60 mol% of the acid component. The precise amount of this dicarboxylic acid depends on the nature of the dicarboxylic acid and the rise in melting point of the polyamides that is desired. Monocarboxylic acids, usually having from 2 to 18 carbon atoms, can also be present in an amount up to 10 percent by weight of the total acid constituent.

The amount of polymeric acid, and possibly other dicarboxylic acid or esters thereof, and the amount of amine component are such that roughly equivalent amounts of primary amine groups and carboxylic groups are present. 90–110 Mol% of amine or salts thereof (based on the polymeric fatty acid, calculated as dimeric fatty acid, and possibly of other dicarboxylic acids or monocarboxylic acids) can be employed. Typically the polyamide obtained has an acid value below 15, and preferably below 10, with an amine value between about 10 and 125, and more preferably between 20 and 100. It is especially useful to have an amine value between about 20 and 40.

A small amount of a $C_5$–$C_{12}$ lactam can also be incorporated into the polyamide as an extender. Such lactams are, for example, caprolactam and laurinlactam. The amount of lactam is less than 40% by weight, based on the dimer, preferably less than 25% by weight.

An especially useful aspect of the present invention is that crude polymeric fatty acids, containing about 75% of dimer, can be reacted to obtain polyamides which are particularly suitable as hot-melt adhesives. Previously useful hot-melt adhesive polyamides were obtainable only by using dimeric fatty acids of greater purity which further had to meet special requirements concerning the content of trimer and higher oligomers with respect to the content of monomers. Such pure dimers, typically containing more than 83% and generally more than 90% of dimer, can only be obtained on a practical scale by molecular distillation, which is cumbersome and costly. It is quite unexpected that flexible polyamides having good elongation and which are tough and exhibit exceptionally high peel strength from metal (steel) can be obtained in accordance with the teachings of this invention using technical grades polymeric fatty acids. Polyamides satisfying these requirements are particularly suitable for use as hot-melt adhesives for metals, wood, paper and textiles.

The preparation of the polyamides takes place by known methods, namely by heating the reactants to a temperature of 180°–300° C., sometimes under a nitrogen atmosphere. Volatile products formed, such as water or lower alcohols, can be distilled off, optionally azeotropically when an entraining agent has been added. Often, at the end of the reaction, heating is carried out under reduced pressure. The polyamide obtained is generally cast into molded articles such as blocks, bars, granules, flakes or films and the like. The solid polyamide is suitable as such for use as a hot-melt adhesive, but sometimes other ingredients, such as oxidation stabilizers and the like are added.

The invention also provides a method for bonding substrate parts together, for which it is also important that the melting point should not be too low and the melt viscosity relatively high, as the adhesive should become firm quickly so that the parts to be bonded only have to be pressed together for generally less than half a minute. This requirement is also met by the polyamide according to the present invention.

The following examples illustrate the invention more fully.

EXAMPLES I–VII

In these experiments polyamides were prepared by reacting equivalent amounts of the acid and amine components for two hours at 200° C. and finally heating for two hours under a pressure of 15–20 mm Hg at 230° C. The reactants and properties of the resulting polyamides are set out in Table I.

TABLE I

| Composition polymeric fatty acid Trimer:Dimer:Monomer | Mol.% polymeric fatty acid | Mol.% azelaic acid | Mol.% EDA | Mol.% BAPMA | Acid value | Amine value | Softening Point (°C.) | Elongation % | E-modulus (kN/cm) | T-peel (N/cm) |
|---|---|---|---|---|---|---|---|---|---|---|
| 3:97:0 | 100 | 0 | 10 | 90 | 2.2 | 12.2 | 110 | >650 | 25 | ND |
| 3:97:0 | 80 | 20 | 85 | 15 | 7.9 | 15.5 | 160 | >600 | 22 | ND |
| 3:97:0 | 70 | 30 | 65 | 35 | 7.0 | 38.1 | 150 | >700 | 10 | ND |
| 3:97:0 | 75 | 25 | 80 | 20 | 7.6 | 18.7 | 160 | >600 | 19 | ND |
| 22:75:3 | 72.5 | 27.5 | 80 | 20 | 2.3 | 25.9 | 165 | 500 | 18 | ND |
| 22:75:3 | 70 | 30 | 70 | 30 | 2.5 | 31.0 | 160 | 525 | 15 | 12 |
| 22:75:3 | 70 | 30 | 70 | 30 | 2.6 | 33.8 | 165 | 625 | 14 | 12 |

EDA = ethylenediamine
BAPMA = bis-(3-aminopropyl)methylamine (98% pure, boiling point 105–110° C. at 10 mm Hg)
Softening Points were determined by the ball and ring method
Elongation and E-modulus were determined with an Instron Tensile Tester, Model 1122, according to ASTM D 638-68 and D 790-66 test methods respectively.
T-peel (tinned steel plate) was determined according to ASTM 876-61 T.
ND = not determined

EXAMPLE VIII

In a manner as described above for Examples I–VII polyamides were prepared as indicated below.

|  | Comparison A | Comparison B | Example VIII |
|---|---|---|---|
| Polymeric fatty acid (eq) | 2.48[1] | 2.24[2] | 3.0[2] |
| Oleic acid (eq) | 0.075 | 0.14 | — |
| Azelaic acid (eq) | 1.12 | 1.33 | 1.59 |
| Ethylene diamine (eq) | 2.60 | 2.21 | 2.67 |
| Diethylene triamine (eq) | 2.23 | — | — |

|  | Comparison A | Comparison B | Example VIII |
|---|---|---|---|
| Hexamethylene diamine (eq) | — | 1.74 | — |
| BAPMA (eq) | — | — | 2.1 |
| Mechanical Properties: | | | |
| Viscosity (poise) | 1.5 | 5.7 | 9.7 |
|  | (160° C.) | (190° C.) | (190° C.) |
| Softening point (°C.) | 140 | 146 | 141 |
| Elongation (%) | 90 | 400 | > 700 |
| T-peel (N/cm) | 13.5 | 5 | 16 |

[1] Empol® 1024, <0.1% monomer, 80% dimer and 20% trimer
[2] Empol® 1010, <0.1% monomer, 96% dimer and 4% trimer.

EXAMPLES IX–XII

In a manner previously described polyamides were prepared and their properties were evaluated as indicated below.

| Example | IX | X | XI | XII | Comparison C |
|---|---|---|---|---|---|
| Polymeric fatty acids (eq) | 3[1] | 1.96[1] | 1.79[1] | 3.0[2] | 2.28 |
| Azelaic acid (eq) | 1.59 | 1.03 | 0.98 | 3.0[3] | 0.53 |
| Isophthalic acid (eq) | — | — | 0.23 | — | — |
| BAPMA (eq) | 2.1 | 1.37 | 1.36 | 3.74 | — |
| EDA (eq) | 2.67 | — | 1.75 | 2.48 | 2.3 |
| HMDA (eq) | — | 1.75 | — | — | 0.57 |
| Stearic acid (eq) | — | — | — | — | 0.18 |
| Acid value | 2.4 | 0.7 | 1.4 | 1.1 | 8.5 |
| Amine value | 58.5 | 62.9 | 55 | 77 | 2.6 |
| Viscosity at 190° C. (poise) | 4.47 | 5.44 | 5.0 | 4.15 | 4.62 |
| Softening point | 116.5° C. | 116° C. | 117° C. | 148° C. | 151° C. |
| Elongation (%) | 510 | 500 | 800 | 250 | 75 |
| T-peel (N/cm) | 14 | 13 | 14.5 | 17.5 | 6 |

[1] Empol® 1024
[2] Empol® 1010
[3] Adipic acid

We claim:

1. A polyamide comprised of groups derived from a polymeric fatty acid containing 70% to 99% dimer acid and 90–110 mole percent of an amine component consisting of 10–100 mole percent triamine of the structure

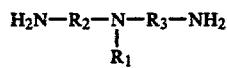

wherein $R_1$ is an alkyl group having from 1–3 carbon atoms and $R_2$ and $R_3$ are the same or different bivalent hydrocarbon radicals together containing from 4 up to about 24 carbon atoms and 0–90 mole percent of a $C_{2-20}$ diamine, said polyamide having an acid value less than 15 and amine value between about 10 and 125.

2. The polyamide of claim 1 wherein $R_2$ and $R_3$ are alkylene radicals of 2 to 4 carbon atoms.

3. The polyamide of claim 2 wherein $R_1$ is a methyl group.

4. The polyamide of claim 3 wherein the triamine is bis-(3-aminopropyl)-methylamine or bis-(3-aminopropyl)-ethylamine.

5. The polyamide of claim 4 wherein the polymeric fatty acid contains 75% to 80% by weight dimer.

6. The polyamide of claim 1 wherein up to 60 mole percent of the acid component is a $C_{2-12}$ dicarboxylic acid, the triamine is bis-(3-aminopropyl)-methylamine or bis-(3-aminopropyl)-ethylamine and the diamine is selected from the group consisting of ethylenediamine, proplyenediamine or hexamethylenediamine.

7. The polyamide of claim 6 wherein the polymeric fatty acid contains from 75% to 80% by weight dimer and the dicarboxylic acid contains from 6 to 9 carbon atoms.

8. A process for bonding substrate parts which comprises melting a polyamide derived from a polymeric fatty acid containing 70% to 99% dimer acid and 90–110 mole percent of an amine component consisting of 10–100 mole percent triamine of the structure

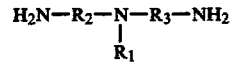

wherein $R_1$ is an alkyl group having from 1–3 carbon atoms and $R_2$ and $R_3$ are the same or different bivalent hydrocarbon radicals together containing from 4 up to about 24 carbon atoms and 0–90 mole percent of a $C_{2-20}$ diamine, said polyamide having an acid value less than 15 and amine value between about 10 and 125, applying the polyamide melt as an essentially continuous layer to at least one substrate part, covering with another substrate part and pressing the parts together.

* * * * *